United States Patent
Bhaggan et al.

(10) Patent No.: US 9,259,015 B2
(45) Date of Patent: Feb. 16, 2016

(54) FAT BLEND

(75) Inventors: Krishnadath Bhaggan, Wormerveer (NL); Jeanine Werleman, Wormerveer (NL); Thomas Louis François Favre, Wormerveer (NL)

(73) Assignee: Loders Croklaan B.V., Wormerveer (NL)

( * ) Notice: Subject to any disclaimer, the term of this patent is extended or adjusted under 35 U.S.C. 154(b) by 0 days.

(21) Appl. No.: 13/696,507

(22) PCT Filed: May 5, 2011

(86) PCT No.: PCT/EP2011/002241
§ 371 (c)(1),
(2), (4) Date: Nov. 6, 2012

(87) PCT Pub. No.: WO2011/138034
PCT Pub. Date: Nov. 10, 2011

(65) Prior Publication Data
US 2013/0052326 A1    Feb. 28, 2013

(30) Foreign Application Priority Data
May 7, 2010 (EP) .................................. 10250894

(51) Int. Cl.
*A23D 9/00* (2006.01)
*A23G 1/38* (2006.01)
*A23G 3/00* (2006.01)
(Continued)

(52) U.S. Cl.
CPC *A23D 9/00* (2013.01); *A23G 1/305* (2013.01); *A23G 1/38* (2013.01)

(58) Field of Classification Search
CPC ........... A23D 9/00; A23G 1/305; A23G 1/38; A23G 2200/08; A23G 2200/00
USPC .................................................. 426/607, 631
See application file for complete search history.

(56) References Cited

U.S. PATENT DOCUMENTS 4,157,405 A    6/1979    Yasuda et al.
4,276,322 A    6/1981    Padley et al.
(Continued)

FOREIGN PATENT DOCUMENTS

EP    0 069 599 A1    1/1983
EP    0 293 194 A2    11/1988
(Continued)

OTHER PUBLICATIONS

Beckett et al. "Physico-Chemical Aspects of Food Processing", p. 155. 1995.*
(Continued)

*Primary Examiner* — Erik Kashnikow
*Assistant Examiner* — Assaf Zilbering
(74) *Attorney, Agent, or Firm* — Hamilton, Brook, Smith & Reynolds, P.C.

(57) ABSTRACT

A fat blend comprises: (i) a first fat having a solid fat content at 25° C. of at least 75% and comprising combined SOS and SSO fats in an amount of greater than 86% by weight, wherein S is saturated fatty acid having from 16 to 18 carbon atoms and O is oleic acid; and (ii) a second fat having a SOS content of greater than 75% by weight and a StOSt content of greater than 70% by weight. The fat blend has a solid fat content at 20° C. of greater than 80% and a solid fat content at 35° C. of less than 5%. The fat blend is useful as a cocoa butter replacer.

10 Claims, 1 Drawing Sheet

(51) Int. Cl.
  *A23G 1/00* (2006.01)
  *A23L 1/05* (2006.01)
  *A23L 1/09* (2006.01)
  *A23G 1/30* (2006.01)

(56) References Cited

U.S. PATENT DOCUMENTS

| 4,465,703 A | 8/1984 | Jasko et al. |
| 4,613,514 A | 9/1986 | Maruzeni et al. |
| 5,401,867 A | 3/1995 | Sitzmann et al. |

FOREIGN PATENT DOCUMENTS

| EP | 0 321 227 B1 | 9/1993 |
| EP | 0 536 824 B1 | 11/1995 |
| EP | 0 751 714 B1 | 8/1999 |
| EP | 0 688 506 B1 | 11/2001 |
| EP | 2 042 607 A1 | 4/2009 |
| GB | 827172 | 2/1960 |
| GB | 925805 | 5/1963 |
| GB | 2 003 912 A | 3/1979 |
| WO | WO 03/053152 A2 | 7/2003 |
| WO | WO 2007/047078 A1 | 4/2007 |
| WO | WO 2009/080288 A1 | 7/2009 |

OTHER PUBLICATIONS

Kellens, Marc et al. 2007. Eur. J. Lipid Sci. Technol 109:336.*
Gee, P. 2007. Eur. J. Lipid Sci. Technol 109:373.*
Notification of Transmittal of the International Search Report and the Written Opinion of the International Searching Authority, or the Declaration; International Application No. PCT/EP2011/002241; Date of Mailing: Aug. 9, 2011.
Talbot, G., "Industrial Chocolate Manufacture and Use," Ch. 19, *Wiley Online Library*, pp. 1-13, (1997).
Torbica, A., et al,, "The Advantages of Solid Fat Content Determination in Cocoa Butter and Cocoa Butter Equivalents by the Karlshamns Method," *European Food Research and Technology*, 222(3-4):385-391 (2006).
Notification Concerning Transmittal of International Preliminary Report on Patentability, International Application No. PCT/EP2011/002241, date of mailing: Nov. 22, 2012.

* cited by examiner

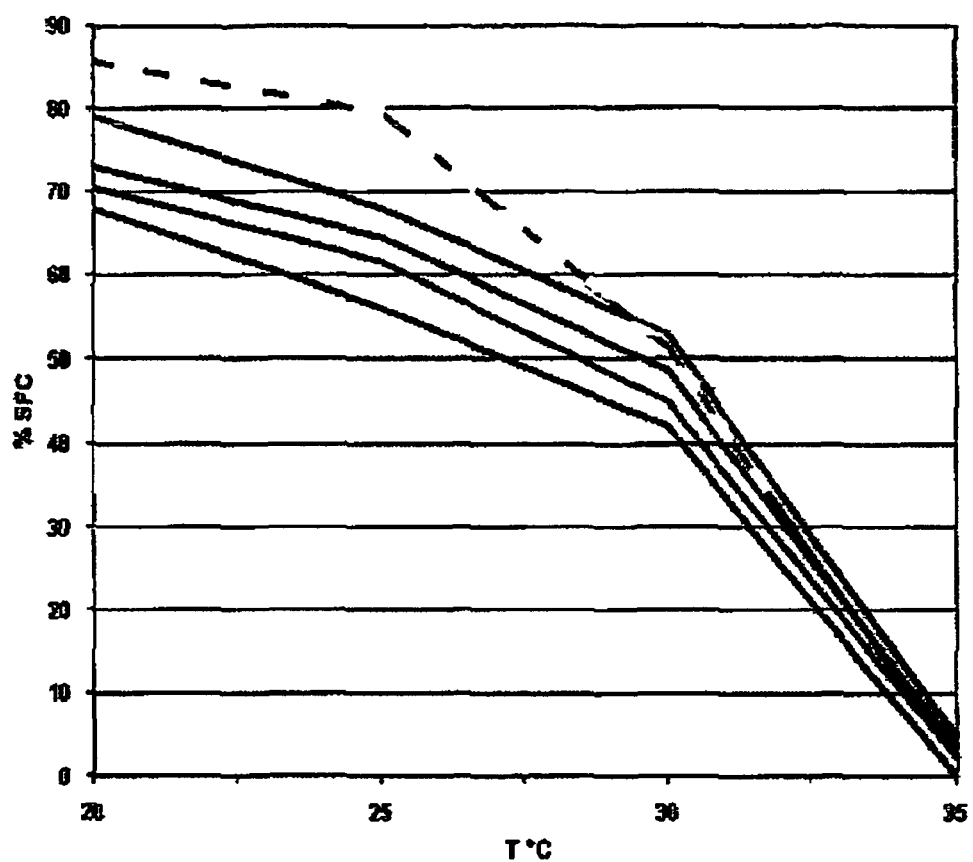

FAT BLEND

This application is the U.S. National Stage of International Application No. PCT/EP2011/002241, filed May 5, 2011, which designates the U.S., published in English, and claims priority under 35 U.S.C. §§119 or 365(c) to European Application No. 10250894.2, filed May 7, 2010.

This invention relates to a fat blend, to a method of making the fat blend, to the use of the fat blend as a cocoa butter replacer, to a chocolate or chocolate-like composition comprising the fat blend and to a food or confectionery product comprising the chocolate or chocolate-like composition.

Cocoa butter is a triglyceride fat that is derived from cocoa beans. Cocoa butter has a melting profile that imparts a desirable mouth feel and flavour release properties to chocolate. Cocoa butter is replaced at least partially in chocolate-like products. The cocoa butter replacers (or substitutes or cocoa butter equivalents (CBEs)) that are used in these chocolate-like products are also triglyceride fats.

GB-A-827,172 describes cocoa butter substitutes which are palm oil fractions having an iodine value (IV) in the range of 30 to 36, a softening point in the range of 32 to 37° C. and a dilatation at 20° C. of not less than 1500.

EP-A-0293194 discloses a cocoa butter replacement fat containing a highly unsaturated liquid glyceride oil. Exemplified are blends of a mid-fraction of palm oil having a total SOS content of 86% with shea fat and sunflower oil. The aim is to allow the accommodation of the highly unsaturated liquid oil into chocolate.

GB-A-2003912 relates to a cocoa butter substitute comprising an intermediate fraction of palm oil having a slip melting point of 29.0-32.5° C. and a clear point of not more than 34° C. and a solid fat fraction of shea fat in which the total content of 2-oleo-1,3-distearin (StOSt) and 2-oleo-palmitostearin (POSt) is lower than 80% by weight. The palm mid-fraction that is used in the examples has a solid fat content at 25° C. of 70.5%.

There remains a need for fat compositions that are derived from materials that are more readily available and less expensive than cocoa butter and that can mimic the properties of cocoa butter more closely, particularly in terms of its melting profile.

Chocolate and chocolate-like products can sometimes melt on the fingers and become sticky or messy. Therefore, there is also a need for chocolate and chocolate-like products containing fat blends that have a melting profile that allows them to resist melting when touched briefly by the fingers as they are eaten but that still provides the advantages of the mouthfeel of chocolate when they are eaten.

Accordingly, the present invention provides a fat blend comprising: (i) a first fat having a solid fat content at 25° C. of at least 75% and comprising combined SOS and SSO fats in an amount of greater than 86% by weight, wherein S is saturated fatty acid having from 16 to 18 carbon atoms and O is oleic acid; and (ii) a second fat having a SOS content of greater than 75% by weight and a StOSt content of greater than 70% by weight. The fat blend has the property of a solid fat content at 20° C. of greater than 80% and a solid fat content at 35° C. of less than 5%.

Also provided by the invention is a method of making a fat blend of the invention, which comprises blending: a first fat having a solid fat content at 25° C. of at least 75% and comprising SOS fats in an amount of greater than 86% by weight, wherein S is saturated fatty acid having from 16 to 18 carbon atoms and O is oleic acid; and a second fat having a SOS content of greater than 75% by weight and a StOSt content of greater than 70% by weight.

Further provided by the invention is the use of the fat blend of the invention as a cocoa butter replacer.

The invention also provides a chocolate or chocolate-like composition comprising a fat blend according to the invention together with one or more components selected from cocoa solids, sugar, milk ingredient and emulsifier.

Yet further provided by the invention is a food or confectionery product comprising the chocolate or chocolate-like composition of the invention.

It will be appreciated by those skilled in the art that SOS refers to triglycerides having S at the 1- and 3-positions in the glyceride and O at the 2-position. Similarly, SSO refers to glycerides having S at the 1- and 2-positions and O at the 3-position. Thus, StOSt means 2-oleoyl-1,3-distearoylglyceride. This nomenclature is standard in the art.

The present invention is based on the surprising finding of a fat blend that has a relatively high solid fat content at 20° C. and a relatively low solid fat content at 35° C. This can impart heat resistance to a chocolate or chocolate-like product when touched whilst staying close to the mouthfeel of cocoa butter.

The fat blend and fats of the invention are glycerides, preferably predominantly triglycerides (e.g., greater than 95% by weight of the glycerides are triglycerides).

The fat blend of the invention comprises a first fat and a second fat. The fat blend may comprise other fats in addition to the first and second fat, typically in an amount of up to 10% by weight of the fat blend. Preferably, however, the fat blend consists essentially of, or consists of, the first fat and the second fat (i.e., in the absence of other fats). Thus, the fat blend may be a two component mixture of fats i.e., the first fat and the second fat.

Preferably, the first fat is a palm mid-fraction and the second fat is a shea stearin. Palm mid-fractions and shea stearin and methods for their production are known to those skilled in the art.

It is preferred that the fat blend is free of liquid oils. Liquid oils are liquid at room temperature (25° C.) and include, for example, vegetable oils such as sunflower oil, olive oil, safflower oil, soybean oil, cottonseed oil, groundnut oil and corn oil.

The fat blend is suitable for use in replacing some or all of the cocoa butter in an edible product. Thus, the fat blend is of food grade.

Preferably, the first fat has an iodine value (IV) of less than 33, more preferably less than 32, such as less than 31. Therefore, the first fat may be a palm oil mid-fraction having an iodine value of less than 33, more preferably less than 32, such as less than 31.

The fat blend preferably comprises at least 40% by weight of the first fat, such as from 50 to 70% by weight of the first fat and from 50 to 30% by weight of the second fat or from 55 to 65% by weight of the first fat and from 45 to 35% by weight of the second fat.

The first fat preferably has a solid fat content at 30° C. of at least 60%, more preferably at least 62%, even more preferably at least 65%. Therefore, the first fat may be a palm oil mid-fraction having an iodine value of less than 33, more preferably less than 32, such as less than 31 and a solid fat content at 30° C. of at least 60%, more preferably at least 62%, more preferably at least 65%.

The first fat preferably has a solid fat content:
at 20° C. of at least 90%; and/or
at 25° C. of at least 85%; and/or
at 30° C. of at least 60%; and/or
at 35° C. of less than 10%; and/or
at 40° C. of less than 1%.

Solid fat content is measured according to IUPAC 2.150 or ISO 8292. The fat or fat blend is preferably held at 60° C., then at 90 minutes in a bath regulated at 0° C., then at 40 hours in a bath regulated at 26° C., then at 90 minutes in a bath regulated at 0° C. The fat or fat blend is then held for 60 minutes in a bath at each measurement temperature which has been chosen prior to measurement on a Bruker Minispec.

Preferably, the first fat is obtained from palm oil by a process comprising wet fractionation in acetone.

The first fat preferably has a palmitic (P) content in the glycerides of greater than 40% by weight, such as greater than 50% by weight, based on the weight of total C10 to C24 fatty acids present.

The first fat preferably has a weight ratio of SOS to SSO triglycerides of greater than 2:1, more preferably greater than 5:1, such as from 7:1 to 20:1.

The first fat preferably has a $SU_2$ content (i.e., combined SUU and USU) of less than 2.5% by weight, more preferably less than 2.2% by weight, wherein S is saturated fatty acid having from 16 to 18 carbon atoms and U is unsaturated fatty acid having from 16 to 18 carbon atoms, such as oleic acid (O).

The second fat preferably has a SOS content of greater than 80% by weight.

The second fat preferably has a solid fat content:
at 20° C. of greater than 85%; and/or
at 25° C. of greater than 80%; and/or
at 30° C. of greater than 75%; and/or
at 35° C. of at least 60%; and/or
at 40° C. of less than 5%.

The second fat may be a shea stearin. Alternatively, the second fat may be a fat that has a relatively high amount of StOSt obtained by other routes. For example, the second fat may be an enzymatically produced StOSt fat. Enzymatically produced StOSt fats may be produced by the selective reaction of a triglyceride having oleoyl groups at the 2-position with stearic acid or a stearoyl ester in the presence of a lipase that is selective for the 1- and 3-positions in the glyceride.

The fat blend preferably has a solid fat content:
at 20° C. of greater than 80%, such as greater than 82%; and/or
at 25° C. of at least 70%, more preferably at least 75%; and/or
at 30° C. of at least 40%, more preferably at least 45%; and/or
at 35° C. of less than 5%, such as less than 3%; and/or
at 40° C. of less than 1%.

A preferred example of a fat blend according to the invention comprises: from 50 to 70% by weight of palm mid-fraction having a solid fat content at 25° C. of at least 80% and comprising combined SOS and SSO fats in an amount of greater than 86%; and from 50 to 30% by weight of shea stearin having a SOS content of greater than 75% by weight and a StOSt content of greater than 70% by weight; the fat blend having a solid fat content at 20° C. of greater than 80% and a solid fat content at 35° C. of less than 5%.

Another preferred example of a fat blend according to the invention comprises: from 50 to 70% by weight of palm mid-fraction having an iodine value of less than 31, a solid fat content at 30° C. of at least 60%, a solid fat content at 25° C. of at least 85% and comprising combined SOS and SSO fats in an amount of greater than 86%; and from 50 to 30% by weight of shea stearin having a SOS content of greater than 80% by weight, a StOSt content of greater than 70% by weight, a solid fat content at 20° C. of greater than 80% and a solid fat content at 25° C. of at least 85%; the fat blend having a solid fat content at 20° C. of greater than 80% and a solid fat content at 35° C. of less than 5%.

The chocolate or chocolate-like composition of the invention comprises a fat blend according to the invention together with one or more components selected from cocoa solids, sugar, milk ingredients and emulsifier. Cocoa solids include, for example, cocoa powder, cocoa butter, cocoa liquor and mixtures thereof. Sugar includes, for example, sucrose. Milk ingredients include, for example, skimmed milk powder and full cream milk powder. Emulsifier is preferably lecithin.

The food or confectionery product comprising the chocolate or chocolate-like composition of the invention is preferably a tablet, praline, countline, hollow figure or a coated bakery product. The coating on a bakery product preferably does not contain cocoa butter. Bakery products include, for example, breads, cakes, cookies and biscuits.

The listing or discussion of an apparently prior-published document in this specification should not necessarily be taken as an acknowledgement that the document is part of the state of the art or is common general knowledge.

The following non-limiting examples illustrate the invention and do not, limit its scope in any way. In the examples and throughout this specification, all percentages, parts and ratios are by weight unless indicated otherwise.

EXAMPLES

FIG. 1 is a plot of solid fat content (SFC) from 0 to 90% against temperature from 20 to 35° C. for several fats. The fat of the invention is shown by a dashed line. All of the other fats are commercially available cocoa butter equivalents.

Example 1

A fat blend according to the invention was prepared by blending 40% of a shea stearin with 60% of a palm oil mid-fraction obtained from palm oil by wet fractionation using acetone. The product and the starting materials analysed as follows:

| Product | | | Example 1 |
|---|---|---|---|
| Shea stearin | 100 | 0 | 40 |
| Palm oil mid-fraction | 0 | 100 | 60 |
| S26N20 NMR | 87.6 | 95.2 | 84.2 |
| S26N25 NMR | 86.9 | 92.1 | 77.9 |
| S26N30 NMR | 83.9 | 67.9 | 52 |
| S26N35 NMR | 69.5 | 4.2 | 1.1 |
| S26N40 NMR | 3.3 | 0 | 0.2 |
| T (max) JENSEN | 36.5 | 30.2 | 29.4 |
| T (min) JENSEN | 28.1 | 24.2 | 29.4 |
| t (max) JENSEN | 63.9 | 73.1 | 69 |
| IV Wijs | 37.5 | * | * |
| IV nIR FTnIR | * | 30.8 | * |
| FFA ol | 1.61 | * | * |
| PV-man | 2.6 | * | * |
| OXSP SP | 0.1 | 0 | * |
| 1.2 DG SP | 0.3 | 0 | * |
| 1.3 DG SP | 1.8 | 0.3 | * |
| DGtot SP | 2 | 0.3 | * |
| MPP HTRI | * | 0.6 | 0.4 |
| MOM HTRI | * | 0 | 0 |
| PPP HTRI | * | 3.3 | 2 |
| MOP HTRI | * | 1.4 | 0.9 |
| MLP HTRI | * | 0 | 0.1 |
| PPSt HTRI | 0.1 | 0.7 | 0.5 |
| POP HTRI | 1.3 | 74.8 | 47.2 |
| PLP HTRI | 0.2 | 2.9 | 1.9 |
| C50DIV HTRI | 0.1 | 0.4 | 0.2 |
| PStSt HTRI | 0.3 | 0.1 | 0.2 |
| POSt HTRI | 7.3 | 11.5 | 11 |

-continued

| Product | | | Example 1 |
|---|---|---|---|
| POO HTRI | 0.5 | 0.9 | 0.7 |
| PLSt HTRI | 0.6 | 0.3 | 0.5 |
| PLO HTRI | 0.1 | 0.2 | 0.2 |
| PLL HTRI | 0 | 0 | 0 |
| StStSt HTRI | 1.5 | * | 0.7 |
| StOSt HTRI | 73 | 2.5 | 27.5 |
| StOO HTRI | 4.2 | 0.1 | 1.6 |
| StLSt HTRI | 5.8 | 0 | 2.2 |
| OOO HTRI | 0.4 | 0 | 0.2 |
| StLO HTRI | 0.4 | 0 | 0.2 |
| OLO HTRI | 0.1 | * | 0.1 |
| StLL HTRI | 0.1 | * | 0 |
| AStSt HTRI | 0.1 | * | 0 |
| AOSt HTRI | 3.3 | 0.1 | 1.3 |
| AOO HTRI | 0.2 | * | 0.1 |
| ALSt HTRI | 0.2 | * | 0.1 |
| DIV | 0.3 | 0.2 | 0.3 |
| SUMSOS HTRI | 81.6 | 88.8 | 85.7 |

The melting profile of the fat blend was determined and is shown in FIG. 1 as a dashed line.

Example 2

The following are examples of chocolate and chocolate coatings that are prepared using the fat blend of Example 1. All percentages are by weight.

| | Chocolate | Coating | | | |
|---|---|---|---|---|---|
| Dark recipe | Cocoa Butter | 5% CBE | 12% CBE | 22% CBE | 34% CBE |
| EXAMPLE 1 FAT BLEND | — | 5 | 12 | 22 | 34 |
| Cocoa butter | 12 | 7 | — | — | — |
| Sugar | 48 | 48 | 48 | 48 | 48 |
| Cocoa powder 10/12% | — | — | — | 10 | 18 |
| Cocoa liquor 50/52% | 40 | 40 | 40 | 20 | — |

| | Chocolate | Coating | | | |
|---|---|---|---|---|---|
| Milk recipe | Cocoa Butter | 5% CBE | 12% CBE | 22% CBE | 29% CBE |
| EXAMPLE 1 FAT BLEND | — | 5 | 12 | 22 | 29 |
| Cocoa butter | 22 | 17 | 10 | — | — |
| Sugar | 46 | 46 | 46 | 46 | 46 |
| Cocoa liquor 50/52% | 12 | 12 | 12 | 12 | — |
| Cocoa powder 10/12% | — | — | — | — | 5 |
| Full cream Milk powder 24% | 20 | 20 | 20 | 20 | 20 |

The invention claimed is:

1. Fat blend comprising: (i) from 50 to 70% by weight of palm mid-fraction having an iodine value (IV) of less than 31, a solid fat content at 30° C. of at least 60% and at 25° C. of at least 85% and comprising combined SOS and SSO fats in an amount of greater than 86% by weight, wherein S is saturated fatty acid having from 16 to 18 carbon atoms and O is oleic acid; and (ii) shea stearin having a SOS content of greater than 75% by weight and a StOSt content of greater than 70% by weight, the fat blend having a solid fat content at 20° C. of greater than 80% and at 35° C. of less than 5%.

2. Fat blend as claimed in claim 1, which is free of liquid oils.

3. Fat blend as claimed in claim 2 which consists essentially of palm mid-fraction and shea stearin.

4. Fat blend as claimed in claim 1 wherein the shea stearin has a SOS content of greater than 80% by weight.

5. Fat blend as claimed in claim 1 comprising from 50 to 30% by weight of the shea stearin.

6. Fat blend as claimed in claim 5, wherein the palm mid-fraction is obtained from palm oil by a process comprising wet fractionation in acetone.

7. Fat blend as claimed in claim 6, wherein the fat blend has a solid fat content at 30° C. of at least 45%.

8. Method of making a fat blend according to claim 1, which comprises blending: a palm mid-fraction having a solid fat content at 30° C. of at least 60% and at 25° C. of at least 85% and comprising SOS fats in an amount of greater than 86% by weight, wherein S is saturated fatty acid having from 16 to 18 carbon atoms and O is oleic acid; and a shea stearin having a SOS content of greater than 75% by weight and a StOSt content of greater than 70% by weight.

9. Chocolate or chocolate-like composition comprising a fat blend according to claim 1 together with one or more components selected from cocoa solids, sugar, milk ingredients and emulsifier.

10. Food or confectionery product comprising the chocolate or chocolate-like composition of claim 9.

* * * * *